United States Patent
Claudel

(10) Patent No.: US 10,069,121 B2
(45) Date of Patent: Sep. 4, 2018

(54) ELECTRIC BATTERY MODULE

(71) Applicant: TYVA ENERGIE, Annonay (FR)

(72) Inventor: Thierry Claudel, Annonay (FR)

(73) Assignee: TYVA ENERGIE, Annonay (FR)

( * ) Notice: Subject to any disclaimer, the term of this patent is extended or adjusted under 35 U.S.C. 154(b) by 106 days.

(21) Appl. No.: 15/024,784

(22) PCT Filed: Sep. 25, 2014

(86) PCT No.: PCT/EP2014/070454
§ 371 (c)(1),
(2) Date: Mar. 24, 2016

(87) PCT Pub. No.: WO2015/044250
PCT Pub. Date: Apr. 2, 2015

(65) Prior Publication Data
US 2016/0293910 A1 Oct. 6, 2016

(30) Foreign Application Priority Data
Sep. 30, 2013 (FR) ..................... 13 59406

(51) Int. Cl.
*H01M 4/00* (2006.01)
*H01M 2/10* (2006.01)
*H01M 2/20* (2006.01)

(52) U.S. Cl.
CPC ......... *H01M 2/105* (2013.01); *H01M 2/1077* (2013.01); *H01M 2/204* (2013.01); *H01M 2/206* (2013.01)

(58) Field of Classification Search
CPC .................................................... H01M 4/00
See application file for complete search history.

(56) References Cited

U.S. PATENT DOCUMENTS 1,546,359 A 7/1925 Baird
2,449,811 A 9/1948 Harford
(Continued)

FOREIGN PATENT DOCUMENTS

DE 10 2011 075 044 A1 11/2012
EP 2 207 221 A1 7/2010
(Continued)

OTHER PUBLICATIONS

International Search Report dated Jan. 8, 2015, issued in corresponding International Application No. PCT/EP2014/070454, filed Sep. 25, 2014, 7 pages.

*Primary Examiner* — Jacob Marks
(74) *Attorney, Agent, or Firm* — Christensen O'Conner Johnson Kindness PLLC

(57) ABSTRACT

Electrical battery module comprising: —a casing (2) comprising a longitudinal body (3) suitable for longitudinally receiving a plurality of electrical batteries (4), one next to the other, and an end cover (5) coupled to one of the ends of said longitudinal body; —an internal, radial electrical connection plate (7) and an external, radial electrical connection plate (8), axially arranged on both sides of said end cover (5); —and at least one axial, electrical connection pad (17, 21) of said internal and external plates (7, 8), axially crossing said cover (5); the interior radial plate (7) comprising a plurality of electrical contact means (13) suitable for being respectively in contact with one end of said electrical batteries (4); and the external radial plate (8) comprising a plurality of electrical distribution means (19) intended for external electrical connection of this external radial plate (8).

16 Claims, 12 Drawing Sheets

(56) References Cited

U.S. PATENT DOCUMENTS

| | | | |
|---|---|---|---|
| 5,489,486 A | 2/1996 | Glover | |
| 2006/0019155 A1 | 1/2006 | Seman, Jr. et al. | |
| 2009/0297892 A1* | 12/2009 | Ijaz | H01M 2/105 |
| | | | 429/7 |
| 2010/0104932 A1 | 4/2010 | Heidenbauer | |

FOREIGN PATENT DOCUMENTS

| | | |
|---|---|---|
| JP | 2001-325931 A | 11/2001 |
| JP | 2013-020841 A | 1/2013 |

* cited by examiner

ELECTRIC BATTERY MODULE

The present invention relates to the field of electric batteries.

There is a need to be able to procure batteries constructed from individual electrochemical cell units, non-rechargeable or rechargeable electric cells, rechargeable electric accumulators, or fuel cells, which have different electrical characteristics depending on their applications.

Currently, made-to-measure batteries of this type are manufactured, on a case-by-case basis. Electric cells, which are generally cylindrical, are placed side-by-side and connected by metal conductor bars spot welded to the radial ends forming electrical contacts, in series and/or in parallel. This assembly is then placed in a sheath made from heat-shrink plastics or in an adapted casing made from metal or plastics and made-to-measure. Such a casing generally has terminals that are connected to the terminals of the battery by electrical wires. Manufacturing in this way is lengthy, tedious and expensive.

Furthermore, patent EP 2 207 221 describes battery modules comprising a casing in which electric cells are placed side-by-side longitudinally. For required assemblies of electric cells in series and/or in parallel, said cells are connected selectively inside the casing by metal conductor bars. The radial ends of the casing are provided with metal through-inserts, these inserts being connected to the ends of the battery constituted in the casing and forming external connection terminals. The casing has a rectangular cross section, certain of the opposing lateral faces thereof having grooves and others having ribs to allow side-by-side coupling of various identical modules and an electrical connection therebetween by virtue of metal conductor bars of which the ends are placed in recesses in the ends of the modules and connected to the metal inserts with which these ends are provided. This is a complex and thus expensive battery.

Various non-modular batteries are described in patents U.S. Pat. Nos. 2,449,811, 1,546,359 and US 2010/0104932, in which the electric cells are connected electrically by bars arranged outside their supports, these battery modules being completely unsuitable for electrical connection to one another.

The aim of the present invention is to propose a battery module that is easier to manufacture and has an enhanced modular structure.

According to one embodiment, an electric battery module is proposed that comprises a casing comprising a longitudinal body suitable for longitudinally receiving a plurality of electric cells, one next to the other, and an end cover coupled to one of the ends of said longitudinal body, said casing comprising first coupling means and second coupling means of complementary forms, such that the first coupling means of a module may be coupled to second coupling means of at least one other module, by mating of forms.

The electric battery module further comprises an internal radial electrical connection plate and an external radial electrical connection plate, arranged axially on either side of said end cover; and also at least one longitudinal electrical connection pad of said internal and external electrical connection plates axially traversing said cover.

The internal radial electrical connection plate comprises a plurality of electrical contact means suitable for being respectively in contact on one end of said electric cells.

The external radial electrical connection plate comprises a plurality of electrical distribution means, such that these electrical distribution means may be selectively connected to electrical distribution means of at least one other module coupled to this module.

The battery module may comprise a fastening means traversing said cover for fastening said internal and external radial electrical connection plates relative to one another, this fastening means including said electrical connection pad.

According to a variant embodiment, at least one of said electrical connection plates may comprise a metal disk.

According to another variant embodiment, at least one of said electrical connection plates may comprise a support plate made from an insulating material and an electrical connection network made from an electrically conducting material, carried by this support plate.

The battery module may comprise fastening means of electrical connection members, in contact on said electrical contact means of said external radial electrical connection plate.

The battery module may comprise fastening means for fastening said internal electrical connection plate to said longitudinal body.

The battery module may comprise fastening means for fastening said cover to said longitudinal body.

The battery module may comprise fastening means for fastening said external electrical connection plate to said cover.

Said external electrical connection plate may bear on said cover, the fastening means for fastening said internal and external electrical connection plates relative to one another acting axially to maintain said cover coupled axially to the longitudinal body.

The battery module may comprise indexing means of the internal radial electrical connection plate and/or of the external radial electrical connection plate relative to the casing.

The battery module may comprise indexing means of the cover relative to said longitudinal body.

Said longitudinal body may comprise an internal partition delimiting a plurality of longitudinal housings for receiving the electric cells.

Said coupling means may be provided on the flanks of said longitudinal body.

Said coupling means may comprise complementary longitudinal grooves and ribs.

Said coupling means may be provided on said cover.

Said coupling means comprise complementary recesses and projecting bosses.

The battery module may comprise, at the other end of said longitudinal body: another end cover coupled to the other end of said longitudinal body; another internal radial electrical connection plate comprising a plurality of electrical contact means suitable for being respectively in contact on the other end of said electric cells; another external radial electrical connection plate comprising a plurality of electrical contact means for external electrical links of this external plate; and another electrical connection means of said other internal and external electrical connection plates, axially traversing said other cover.

Also proposed is an assembly of at least two battery modules, wherein two battery modules are placed longitudinally one next to the other and coupled laterally by means of said first and second complementary coupling means in a position such that their external radial electrical connection plates extend in one and the same radial plane, these external radial electrical connection plates being electrically connected by a metal link plate; and/or wherein two battery modules are aligned one above the other and coupled axially by means of said first and second complementary coupling means in a position such that their external radial electrical connection plates extend one facing the other, these external radial electrical connection plates being electrically connected by means of an elastic bar or spring.

A battery module according to the present invention will now be described by way of nonlimiting example, illustrated by the drawing, in which.

Figure 1:
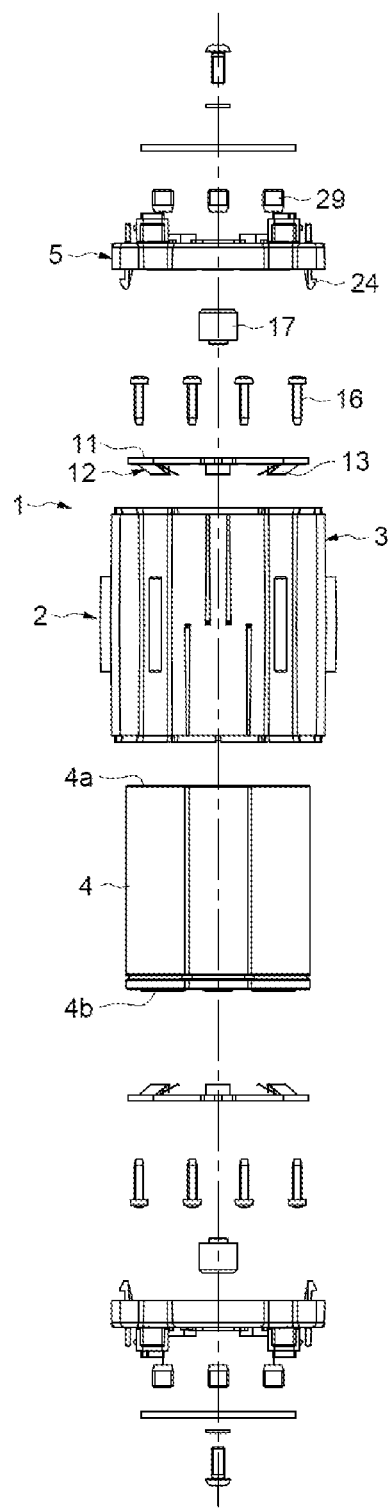
FIG. 1 shows an expanded side view of the battery module.
Figure 2:
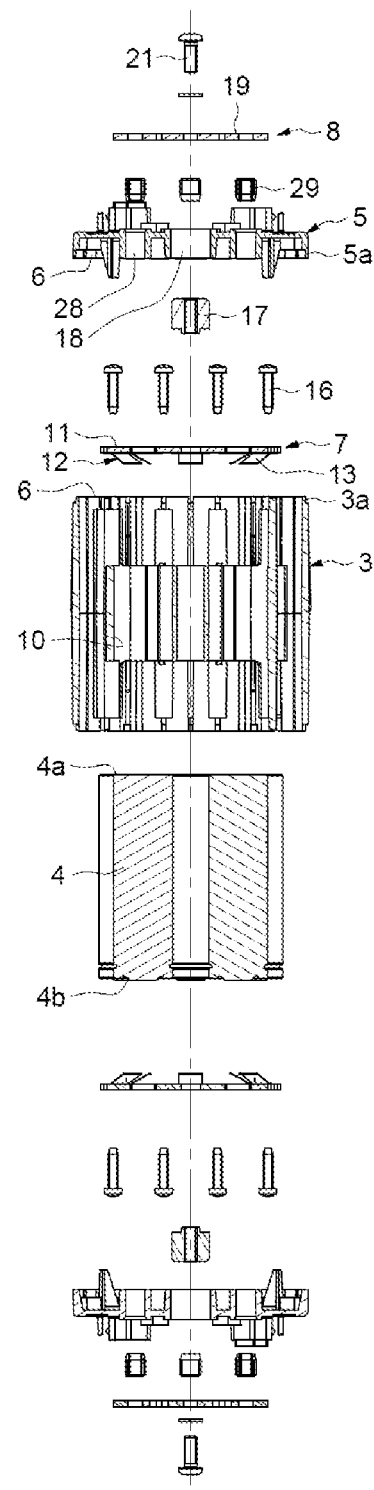
FIG. 2 shows a vertical cross section of the expanded view of FIG. 1.
Figure 16:
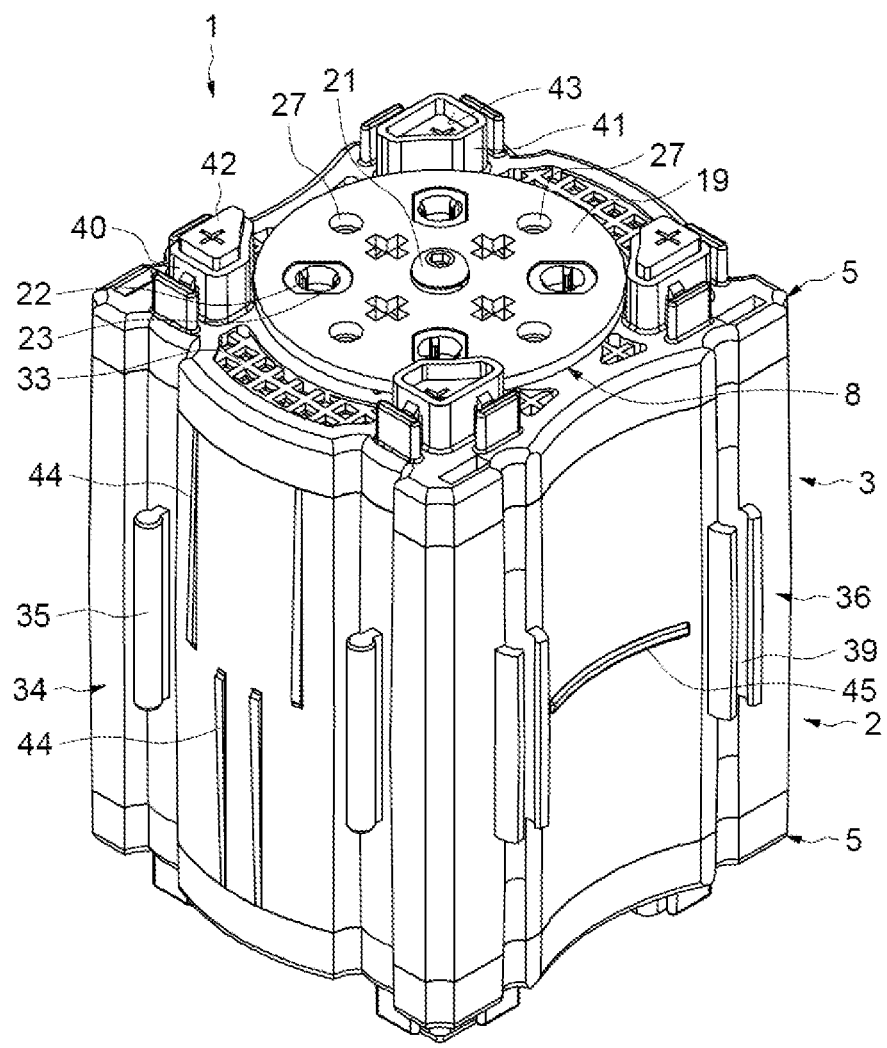
FIG. 16 shows a perspective exterior view of the battery module.

As illustrated, in particular, in FIGS. 1, 2 and 16, a battery module 1 comprises a casing or shell 2, for example made from plastics, which comprises a longitudinal body 3 that is open at its ends, the perimeter of which is substantially square or rectangular in cross section and suitable for longitudinally receiving a plurality of electric cells 4, one next to the other or close to the others.

The casing 2 further comprises opposing end covers 5 coupled to the opposing ends of the longitudinal body 3 along peripheral mating planes 6. To this end, the edges of the ends of the longitudinal body 3 and the edges of the end covers 5 have external and internal positioning shoulders 3a and 5a that fit longitudinally one into another, indexing the covers 5 relative to the longitudinal body 3.

The electric cells 4 are generally cylindrical and have radial end faces 4a and 4b forming opposing, positive and negative, electrical contacts. According to the present description, "electric cell" is understood to mean, in particular, any individual electrochemical cell unit, any non-rechargeable or rechargeable electric cell, and any rechargeable electric accumulator.

By way of electrical connection means, the battery module 1 comprises internal radial electrical connection plates 7 placed inside the casing 2, respectively between the ends of the electric cells 4 and the end covers 5, and also external radial electrical connection plates 8 placed outside the casing 2, such that, respectively, the internal radial electrical connection plates 7 and the external radial electrical connection plates 8 are arranged axially on either side of the end covers 5.

Figure 3:
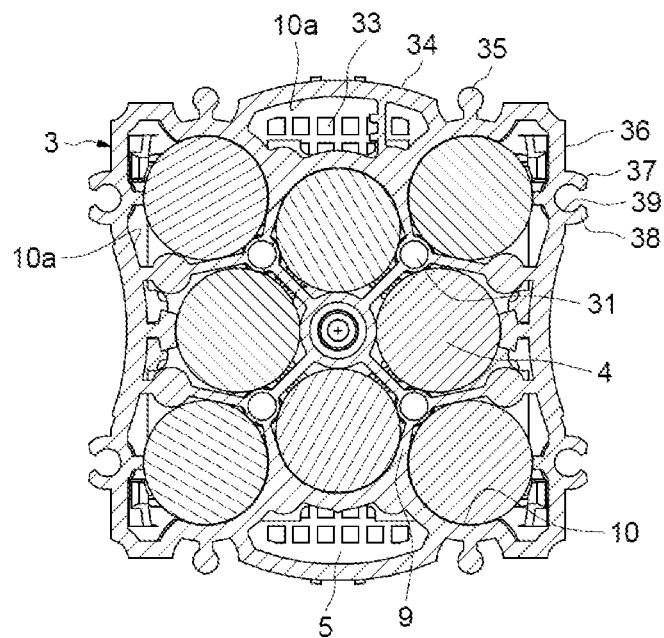
FIG. 3 shows a median transverse cross section of the battery module.

As illustrated, in particular, in FIG. 3, the longitudinal body 3 comprises an internal longitudinal partition 9 delimiting longitudinal housings 10 for receiving electric cells 4, such that these electric cells are at a short distance from one another.

According to the example shown, this internal longitudinal partition 8 delimits eight longitudinal receiving housings 10. Four internal housings are arranged in the form of a star at 90° relative to one another, their centers being arranged on one and the same circle and in correspondence with the middles of the sides of the longitudinal body 3. Four external housings are arranged in the form of a star at 90° relative to one another and offset by 45° relative to the internal housings, their centers being arranged on one and the same circle and substantially in correspondence with the diagonals of the longitudinal body 3. The internal longitudinal partition 8 also delimits longitudinal corridors 10a adjacent the sides of the longitudinal body 3.

Figure 4:
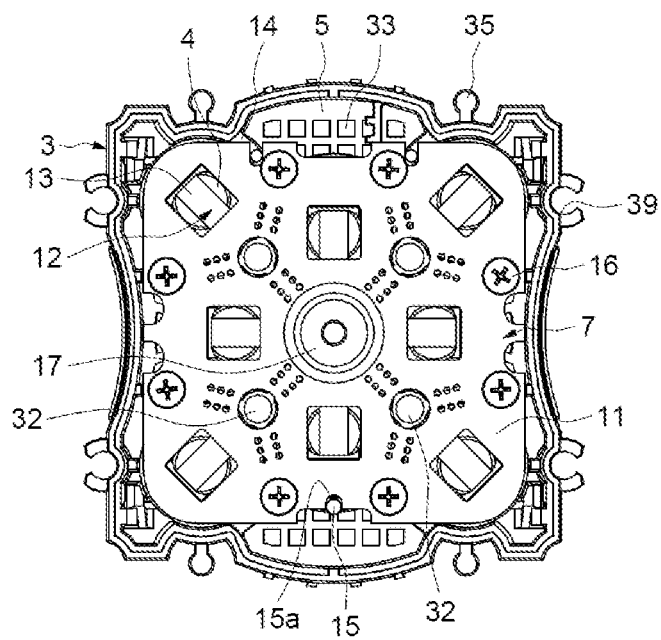
FIG. 4 shows an end view of the battery module without the cover and without the external radial disk.
Figure 8:
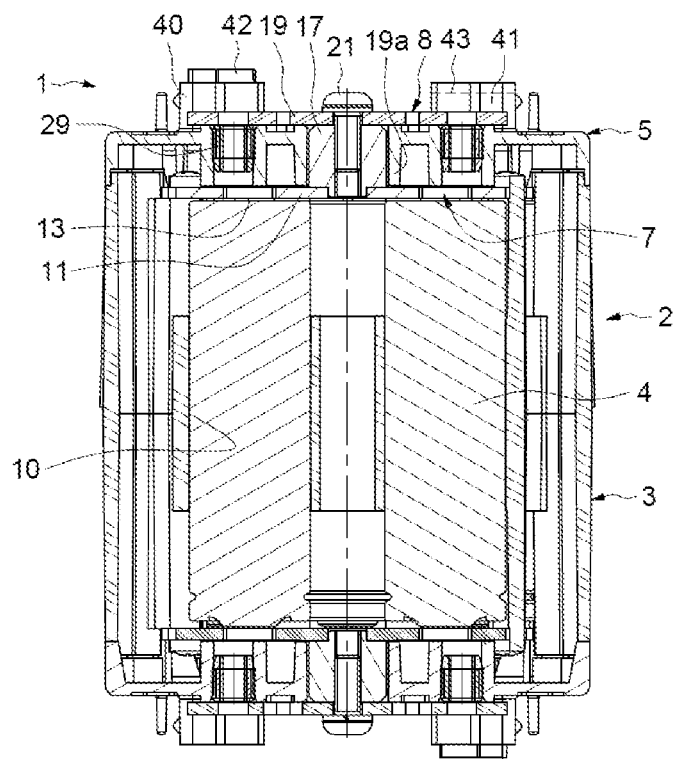
FIG. 8 shows a longitudinal cross section of the battery module.

As illustrated, in particular, in FIGS. 4 and 8, each internal radial electrical connection plate 7 comprises a support plate 11 made from an insulating material, provided with an electrical connection network 12 produced on the surface and/or at a depth. This electrical connection network 12 includes, on the side of the electric cells 4, resilient metal bars 13 distributed in such a manner as to come to bear elastically on the corresponding end faces of the electric cells 4, forming electrical contacts of identical or different polarities. The electrical connection network 12 may comprise metal electrical connection strips provided on the surface or incorporated into the support plate 11 in the manner of conventional printed circuit boards. Thus, the internal radial electrical connection plate 7 constitutes a direct electrical collection means inside the casing.

Each support plate 11 bears on peripheral internal zones forming an internal radial shoulder 14 of the longitudinal body and is indexed by virtue of projecting longitudinal fingers 15 of the longitudinal body 3 engaged in passages 15a of the support plate 11.

Each support plate 11 is fastened to the longitudinal body 3 by virtue of longitudinal screws 16 that pass through it.

Thus, the electric cells 4 are held axially between the bars 13 of the internal opposing radial electrical connection plates 7 and may be installed, selectively, electrically in parallel and/or in series, depending on the arrangement of the electrical connection network 12. If two electric cells are connected in series, the electrical connection network 12 comprises a specific connection for connecting these latter.

Figure 5:
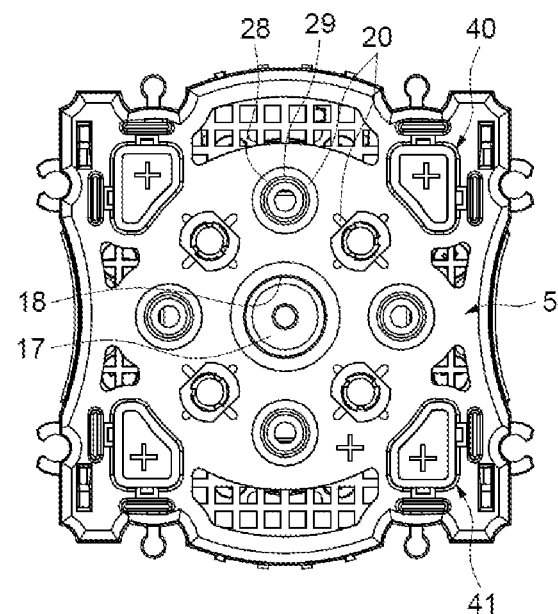
FIG. 5 shows an end view of the battery module with the cover but without the external radial disk.

As illustrated, in particular, in FIGS. 4 and 5, each support plate 11 is provided with a cylindrical central metal pad 17 that extends longitudinally, projecting outward, and is connected to its aforesaid electrical connection network 12. This central pad 17 may be mounted on the support plate 11, for example by crimping or welding or screw-fitting or gluing.

As illustrated, more particularly, in FIG. 8, each central metal pad 17 extends through a central through-passage 18 of the end cover 5.

Figure 6:
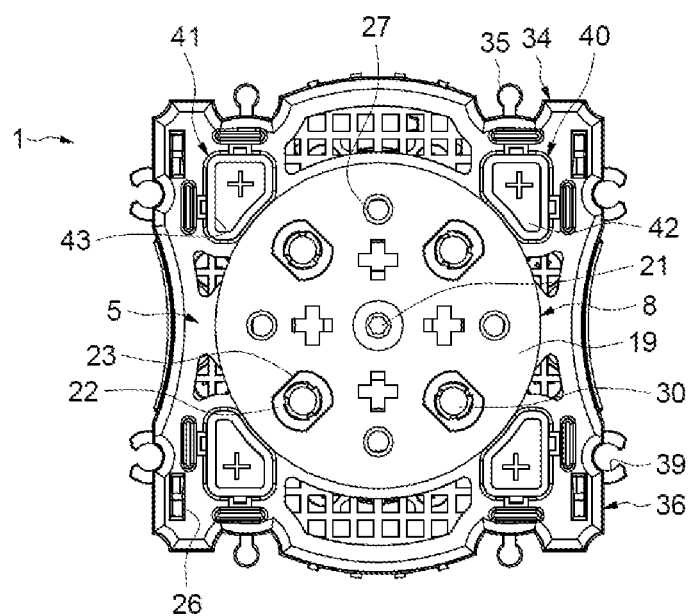
FIG. 6 shows a complete end view of the battery module.

As illustrated, more particularly, in FIGS. 6, 8 and 16, each external radial electrical connection plate 8, which constitutes an electrical distribution means for producing a plurality of exterior electrical links, comprises a radial metal disk 19 that comes to bear on the external bosses 20 that project axially and are formed on the external radial faces of the corresponding end cover 5. Each metal disk 19 has a diameter that is markedly greater than the diameter of the central pad 17, but smaller than the smallest of the sides of the cover 5, so as not to protrude laterally.

Each metal disk 19 is fastened, by means of a central metal fastening screw 21 that traverses it, on the central metal pad 17 of the corresponding internal radial electrical connection plate 7, maintaining the corresponding cover 5 bearing on the bosses 20 and coupled to the longitudinal body 3.

Thus, each projecting metal pad 17 and each metal fastening screw 21 constitute an electrical connection means between the corresponding metal disk 19 forming the corresponding external electrical connection plate 8 and the metal bars 13 of the electrical connection network 12 of the corresponding internal electrical connection plate 7.

The result of this is that the radial metal disks 19 arranged on the outside and at the opposite ends of the module 1 constitute positive and negative poles of the battery.

Each radial metal disk 19 is indexed relative to the corresponding end cover 5. To this end, each end cover 5 has protruding bearing bosses 22 engaged in through-passages 23 of the corresponding radial metal disk 19. The protruding bosses 22 and the through-passages 23 are oblong in form. According to the example shown, four protruding bosses 22 and four through-passages 23 are provided, offset by an angle of 90° and arranged substantially on the diagonals of each cover 5 and on one and the same diameter.

Preferably, these oblong forms associated with the end cover and with the radial disk provided at one of the ends of the longitudinal body 3 and the oblong forms associated with the end cover and with the radial disk provided at the other end of the longitudinal body 3 have different orientations such that each end cover 5 and each disk 19 correspond to a polarity of the electric cells 4.

Figure 7:
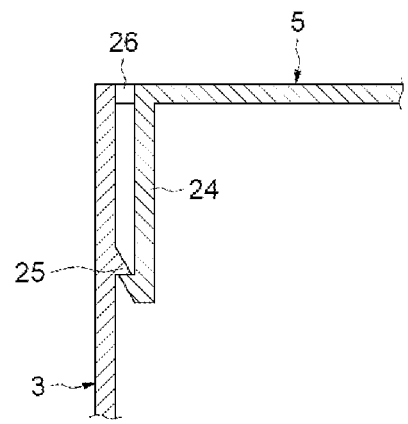
FIG. 7 shows a cross-sectional detail of the battery module.

As illustrated, in particular, in FIGS. 6 and 7, each cover 5 comprises internal longitudinal tabs 24 in the form of elastically deformable hooks that come to engage, by elastic deformation, with internal attachment bosses 25 of the longitudinal body 3 in such a manner as to maintain the end cover 5 coupled to the longitudinal body.

Each cover 5 has through-passages 26 for access to the attachment tabs 24 in such a manner that it is possible to separate them with a tool and to separate the end cover 5 from the longitudinal body 3. According to the example shown, attachment tabs 24, attachment bosses 25 and access passages 26 are provided at the four corners of the end covers 5 and of the ends of the longitudinal body 3.

As illustrated, in particular, in FIGS. 5 and 6, each radial metal disk 19 has four through-holes 27 arranged at 90° relative to one another, on one and the same circle and in correspondence with the middles of the sides of the corresponding end cover 5.

Below these through-holes 27, each end cover 5 has a fastening boss 20 on which it bears. Each fastening boss 20 has a hole 28 in which a threaded insert 29 is screwed.

As illustrated, in particular, in FIGS. 3, 4 and 6, the covers 5 have through-holes 30 provided through indexing bosses 22, which are aligned longitudinally, the longitudinal body 3 has, through its partition 9 and in the zones separating the aforesaid internal and external housings 10, longitudinal passages 31, and the support plates 11 have through-passages 32. The through-holes 30 of the covers 5, the longitudinal passages 31 and the through-holes 32 of the support plates 11 are aligned longitudinally, constituting longitudinal channels for longitudinally receiving link rods thus traversing the module 1 from side to side.

Optionally, each end cover 5 has projecting parts 19a for applying the internal electrical connection plate 7 on the corresponding internal radial shoulder 14 of the longitudinal body 3.

Each cover 5 has ventilation through-openings 33 such that cooling air is able to circulate inside the casing 2 by passing through the openings 10, 10a, 33.

Figure 9:
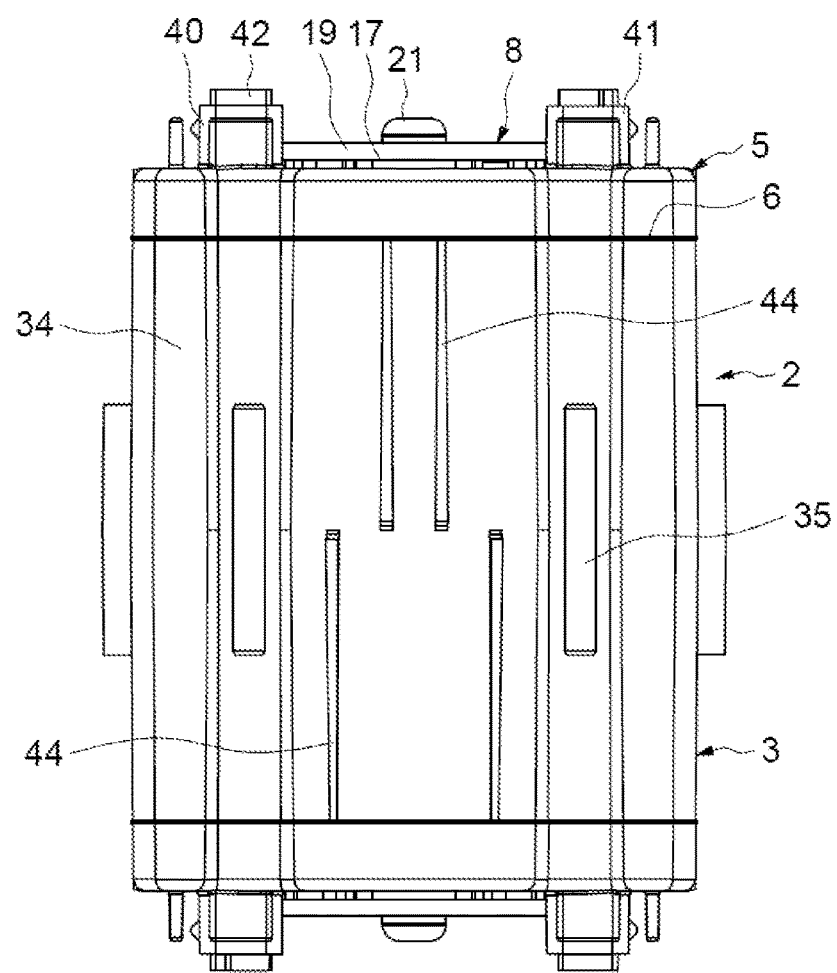
FIG. 9 shows a view of one side of the battery module.

As illustrated, in particular, in FIGS. 3, 9 and 16, two external opposite faces 34 of the longitudinal body 3 have, projecting, longitudinal coupling ribs 35 of omega-formed cross section. According to the example shown, each of these external faces has two ribs 35 spaced transversely and symmetrically relative to the corresponding median plane of the longitudinal body 3 and extending over a median part of these external faces.

Figure 10:
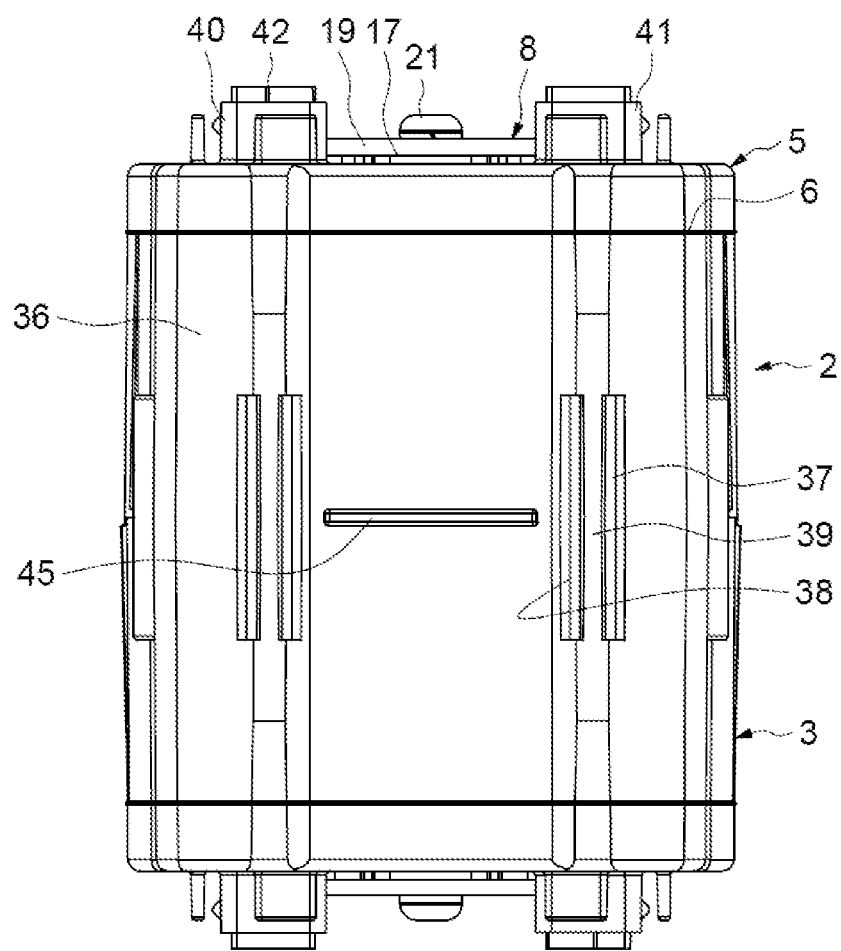
FIG. 10 shows a view of another side of the battery module.

As illustrated, in particular, in FIGS. 3, 10 and 16, the two other external opposite faces 36 of the longitudinal body 3 have, projecting, pairs of longitudinal ribs 37 and 38 defining longitudinal coupling grooves 39 in the form of a C. According to the example shown, each of these external faces has two longitudinal grooves 39 spaced transversely and symmetrically relative to the corresponding median plane of the longitudinal body 3 and extending over a median part of these external faces.

The longitudinal ribs 35 and the longitudinal grooves 39 have complementary cross sections and are spaced by the same distance.

As illustrated, in particular, in FIGS. 6, 8, 9, 10 and 16, each cover 5 has, on its external, longitudinally projecting radial face, two diagonally opposite spacing feet 40 and two diagonally opposite spacing feet 41, which extend beyond the corresponding radial disk 19.

In their median parts, the spacing feet 40 have longitudinal coupling bosses 42 and the spacing feet 41 have longitudinal coupling recesses 43.

The longitudinal coupling bosses 42 and the longitudinal coupling recesses 43 have complementary forms and are aligned longitudinally from one end cover 5 to the other.

Figure 11:
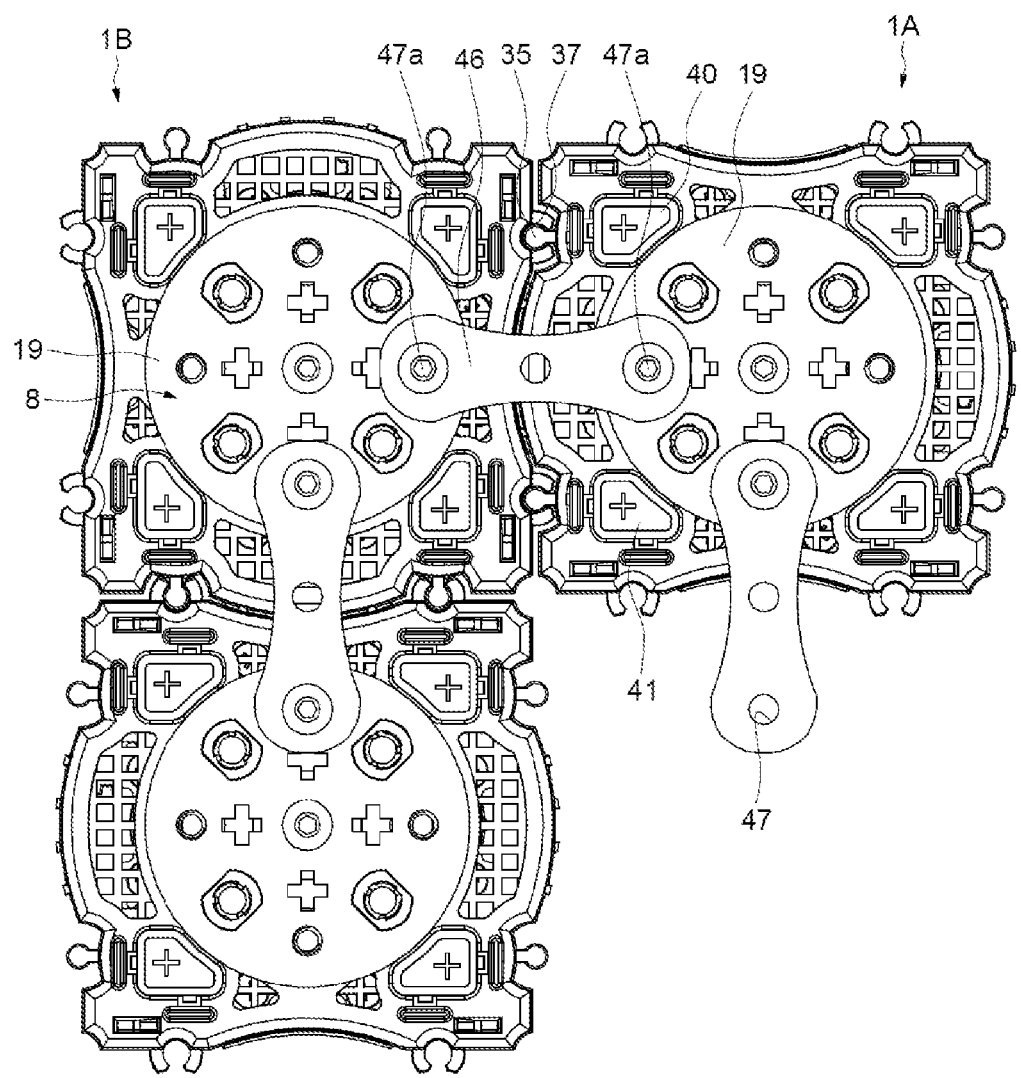
FIG. 11 shows an end view of a plurality of battery modules coupled laterally.
Figure 12:
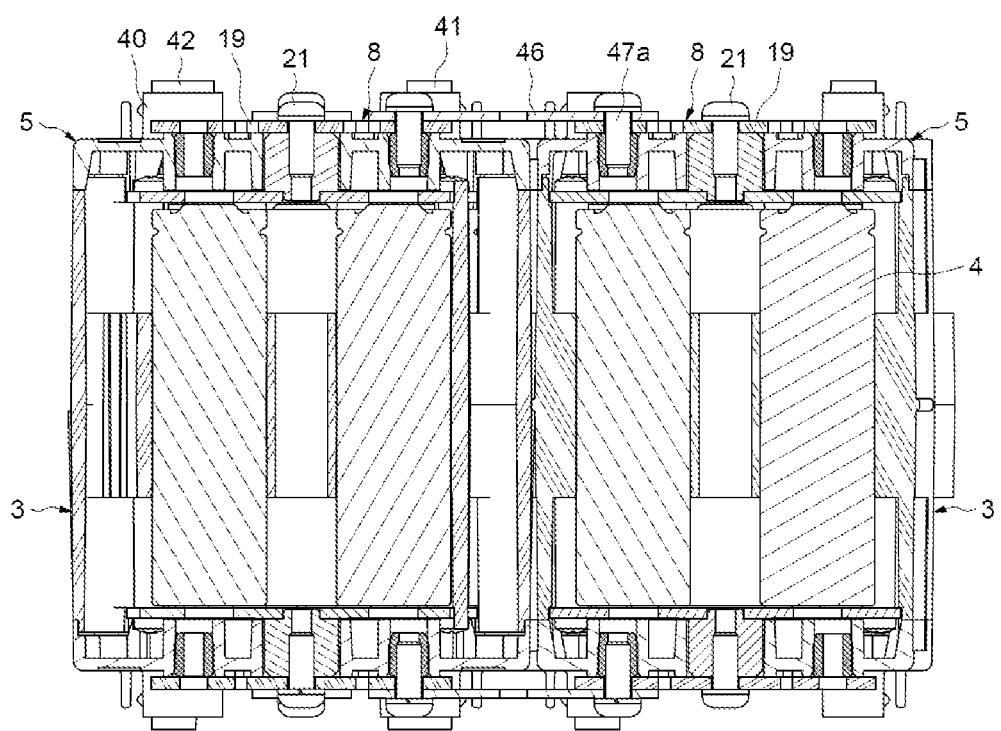
FIG. 12 shows a longitudinal cross section of two battery modules coupled laterally.
Figure 13:
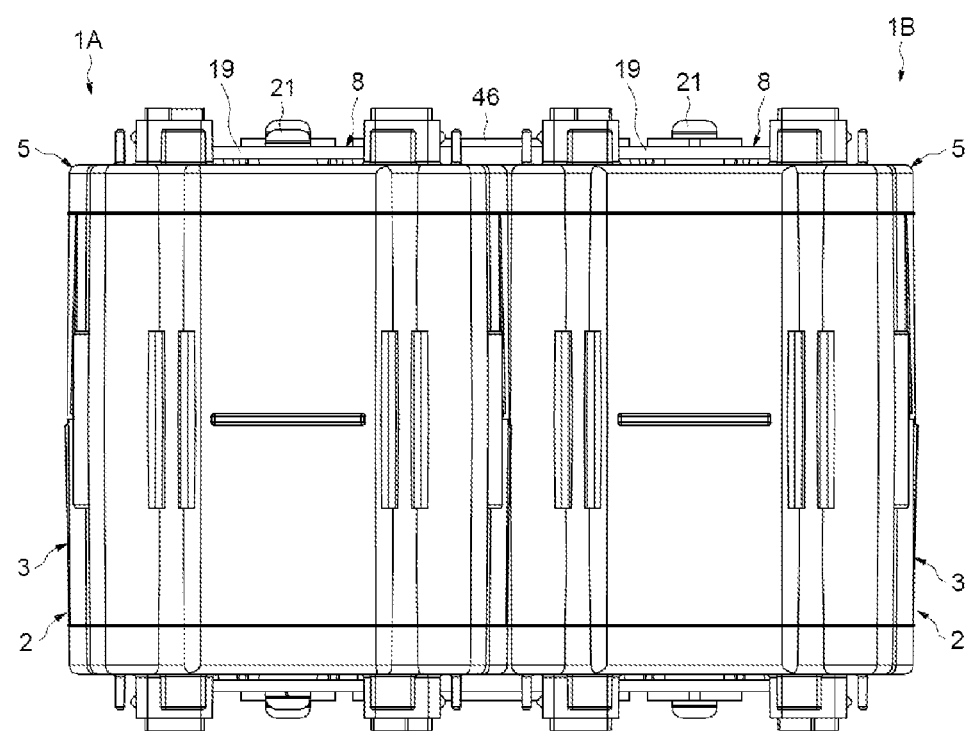
FIG. 13 shows a side view of two battery modules coupled laterally.

With reference to FIGS. 11, 12 and 13, it may be seen that two battery modules 1A and 1B may be placed one alongside the other or side-by-side and coupled laterally. To that end, for example, the two longitudinal coupling ribs 35 of one of the faces of the battery module 1A are engaged longitudinally in two longitudinal coupling grooves 39 of the battery module 1B until the battery modules 1A and 1B are at the same height, the corresponding lateral faces 34 and 36 being placed so as to lie adjacent to one another.

In this assembled position, the radial metal disks 19 arranged at the ends of the casings 3 extend, respectively, in radial planes.

To index the battery modules in this coupling position, the lateral faces 34 and 36 of each battery module may have indexing ribs interacting with one another. For example, as shown, in particular, in FIGS. 9 and 10, the lateral faces 34 may have ribs 44 spaced in the longitudinal direction and the lateral faces 36 may have a transverse rib 45. In said assembled position, the transverse rib 45 is placed in the space longitudinally separating the ribs 44.

The radial metal disks 19 located in one and the same radial plane may be electrically connected by virtue of a metal link plate 46 having, at its ends, through-holes 47. To that end, the end parts of the link plate 46 are arranged flat on the local electrical distribution zones of the radial disks 19 surrounding the holes 27 closest to these disks 19 and fastening screws 47a are put in place through the holes 47 and and are screwed in the corresponding inserts 29 of the corresponding covers 5. The link plate 46 passes between and at a distance from the adjacent feet 40 and 41 of the battery modules 1A and 1B.

Thus, the metal link plate 46 may be adapted to form a mechanical link between the battery modules 1A and 1B.

The battery modules 1A and 1B may be assembled in a direction such that the radial disks 19 located in one and the same plane are poles of the same signs, or in an opposite direction such that the radial disks 19 located in one and the same plane are poles of opposite signs.

By implementing the assembly described above, it is possible to constitute a complex battery as a layer constituted by a required plurality of adjacent individual battery modules 1, in which each individual battery module is coupled, in one direction or in the other, to one, two, three or four adjacent individual battery modules and electrically connected, in four possible directions, to these latter by link plates 46 in accordance with a desired electrical layout.

Figure 14:
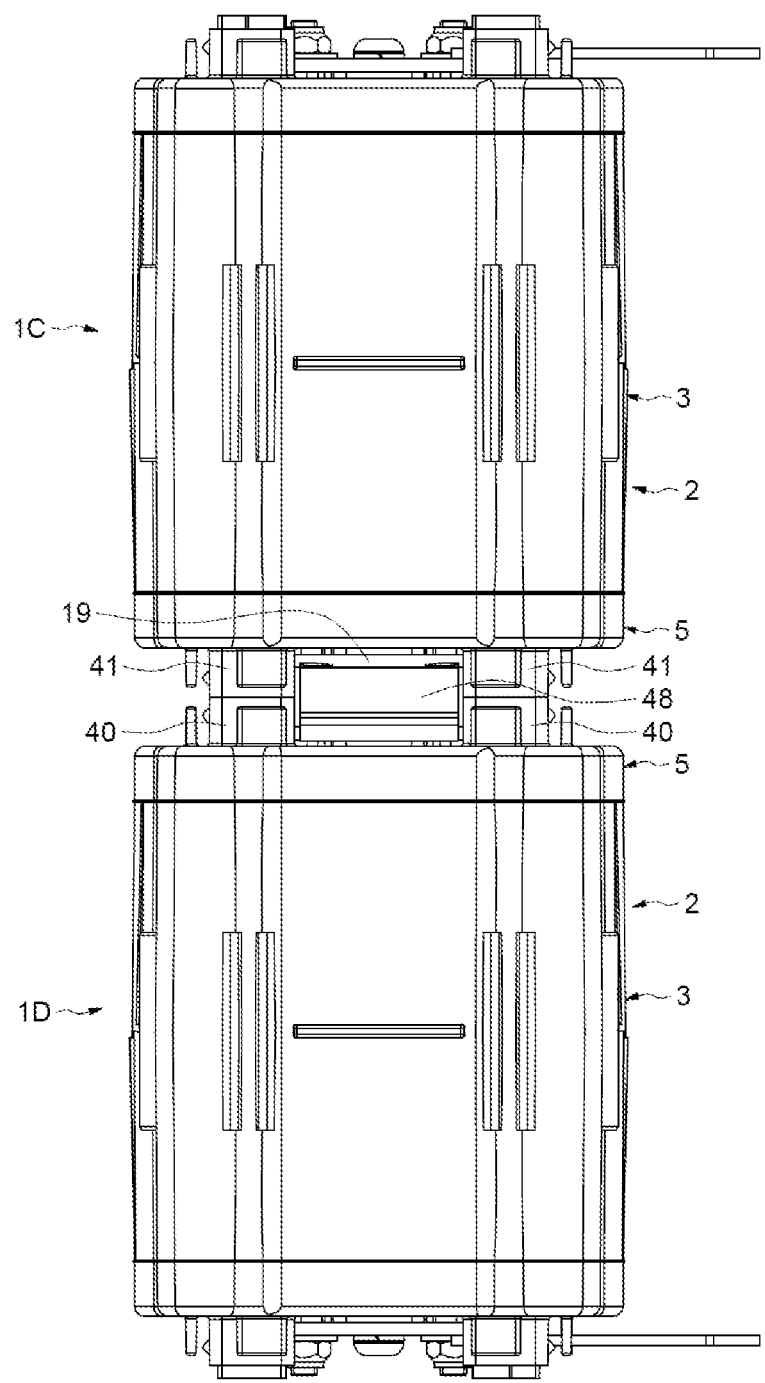
FIG. 14 shows a side view of two battery modules coupled end-to-end.
Figure 15:
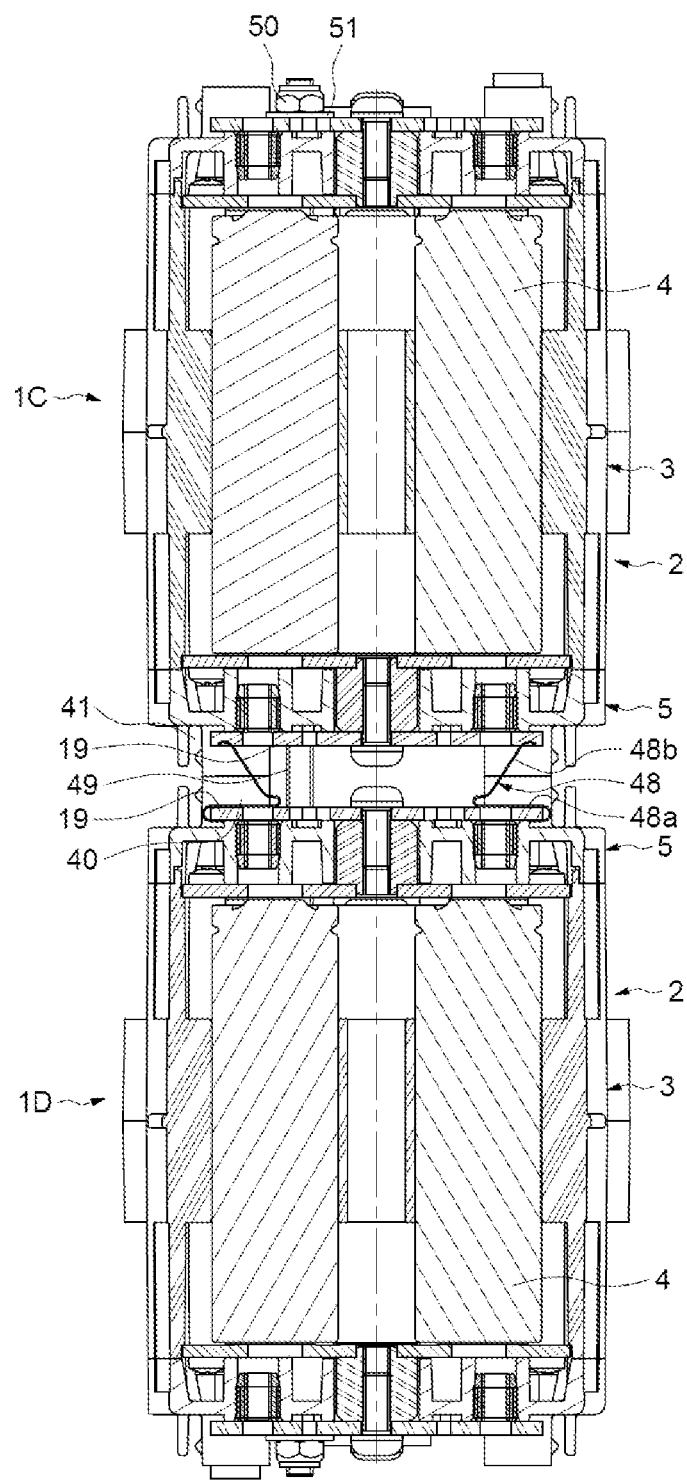
FIG. 15 shows a longitudinal cross section of two battery modules coupled end-to-end.

With reference to FIGS. 14 and 15, it is possible to see that two battery modules 1C and 1D may be placed one above the other and coupled. To that end, the coupling bosses 42 are engaged longitudinally in the coupling recesses 43 of the corresponding feet 40 and 41 of the battery modules 1C and 1D until they are in abutment. The battery modules 1C and 1D are then aligned and coupled longitudinally, and a radial disk 19 of one is located facing and at a short distance from a radial disk 19 of the other.

In order to connect these radial disks 19 electrically in series, one or more resilient metal bars 48 may be provided, which, for example, have a U-part 48a that surrounds the edge of the radial disk 19 of one of the modules 1C and 1D and have an inclined overhanging tab 48b in contact on the front face of the disk 19 of the other module. According to a variant embodiment, the radial disks 19 could be electrically connected by means of one or more resilient metal pieces of U- or W-form cross section engaged laterally in such a manner as to hold the radial disks 19 between their opposite branches.

In order to secure the battery modules 1C and 1D, provision may be made for electrically insulated ties 49 traversing them freely by passing longitudinally in the aforesaid aligned longitudinal channels of these modules, formed respectively by the through-holes 30, the longitudinal passages 31 and the through-holes 32. These ties 49 carry tightening nuts 50 bearing on the radial disks 19 by means of electrical insulation joints 51 in the case where they are made from metal.

According to a variant embodiment, the ties could be placed longitudinally outside the modules and the nuts could bear on the opposite covers of the stack of battery modules.

According to a variant embodiment, the ties could be dispensed with and the resilient metal bars 48 could be adapted to effect the mechanical link between the battery modules 1C and 1D.

By implementing the assembly by stacking described above, it is possible to constitute a complex battery as a column, constituted by a required plurality of individual battery modules 1 placed one above the other. In each assembly, each individual battery module is coupled, in one direction or the other, to one or two adjacent individual battery modules and is electrically connected to these latter by resilient metal bars 48, in accordance with an electrical layout in series.

Now, by combining the side-by-side assembly and the stack assembly described above, it is possible to constitute a three-dimensional battery composed of a plurality of layers and a plurality of columns of battery modules 1, in accordance with a required arrangement and in accordance with a required electrical layout.

According to a variant embodiment, where sufficiently strong attachment tabs 24 and attachment bosses 25 are provided, the fastening screws 16 could be dispensed with, the internal radial electrical connection plates 7 being held between the internal projecting parts 19a of the covers 5 and the internal radial shoulder 14.

According to a further variant embodiment, the attachment tabs 24 and the attachment bosses 25 could be dispensed with. In this case, the covers 5 could be fastened to the longitudinal body 3 by longitudinal screws.

According to a variant embodiment, the internal radial electrical connection plates 7 could be formed by metal plates provided with contact bars on the electric cells 4 and carrying the metal pads 17.

According to a variant embodiment, the external radial electrical connection plates 8 could be formed by plates made from an insulating material provided with an electrical connection network.

According to a variant embodiment, the longitudinal pads 17 could be fastened on the external radial electrical connection plates 8 and connected to the internal radial electrical connection plates 7 by screws traversing them.

According to a variant embodiment, the longitudinal pads 17 could be sandwiched between the external radial electrical connection plates 8 and the internal radial electrical connection plates 7 and mounted by screws traversing them.

According to a variant embodiment, the internal radial electrical connection plates 7 could be provided with a plurality of radially spaced longitudinal pads 17.

According to a variant embodiment, the battery module could comprise, at one of its ends, another electrical connection arrangement of the electric cells 4, in series and/or in parallel.

According to a variant embodiment, the casing 2 could be made from metal and electrically insulated from the aforesaid electrical parts of the battery.

According to further variant embodiments, the number of electric cells could be different and their arrangement could also be different.

The present invention is not limited to the examples described above. A number of variant embodiments are possible without departing from the scope of the invention.

The invention claimed is:

1. An electric battery module comprising:
   a casing (2) comprising a longitudinal body (3) suitable for longitudinally receiving a plurality of electric cells (4), one next to the other, and an end cover (5) coupled to one of the ends of said longitudinal body, said casing comprising first coupling means (35; 42) and second coupling means (39; 43) of complementary forms, such that first coupling means of a module is to selectively couple to second coupling means of at least one other module, by mating of forms, for coupling laterally at least two modules placed one next to the other and coupling longitudinally at least two modules placed aligned longitudinally one above the other;
   an internal radial electrical connection plate (7) and an external radial electrical connection plate (8), arranged longitudinally on opposing sides of said end cover (5); and
   a longitudinal electrical connection pad (17) longitudinally traversing said cover (5) and connected to said internal and external electrical connection plates disposed on opposing sides of the cover, the internal radial electrical connection plate (7) comprising an electrical connection network (12) and a plurality of electrical contact means (13) suitable for being respectively in contact with the corresponding end contacts of said electric cells (4), so as to connect electrically the cells to the longitudinally electrical connection pad, and the external radial electrical connection plate (8) comprising a metal conductive disk (19) electrically connected to the longitudinally electrical connection pad and having a plurality of electrical distribution contact zones, such that the electrical distribution contact zones are to selectively connect to electrical distribution contact zones of at least one other module coupled to the module.

2. The module as claimed in claim 1, comprising a fastening means (17, 21) traversing said cover (5) for fastening said internal and external radial electrical connection plates (7, 8) relative to one another, this fastening means including said electrical connection pad.

3. The module as claimed in claim 1, wherein the electrical contact means of the internal radial electrical connection plate (7) comprise resilient bars (13).

4. The module as claimed in claim 1, comprising fastening means (16) for fastening said internal electrical connection plate to said longitudinal body.

5. The module as claimed in claim 1, comprising fastening means (24, 25) for fastening said cover to said longitudinal body.

6. The module as claimed in claim 1, comprising fastening means (21, 47a) for fastening said external electrical connection plate to said cover.

7. The module as claimed in claim 1, wherein said external electrical connection plate (8) bears on said cover (5), the fastening means (17, 21) for fastening said internal and external electrical connection plates relative to one another acting axially to maintain said cover coupled axially to the longitudinal body (3).

8. The module as claimed in claim 1, comprising indexing means (15, 16; 22, 23) of the internal radial electrical connection plate (7) and/or of the external radial electrical connection plate (8) relative to the casing (2).

9. The module as claimed in claim 1, comprising indexing means (3a, 5a) of the cover (5) relative to said longitudinal body (3).

10. The module as claimed in claim 1, wherein the longitudinal body comprises an internal partition (9) delimiting a plurality of longitudinal housings (10) for receiving the electric cells.

11. The module as claimed in claim 1, wherein said coupling means are provided on the flanks (34, 36) of said longitudinal body (3).

12. The module as claimed in claim 11, wherein said coupling means comprise complementary longitudinal grooves and ribs.

13. The module as claimed claim 1, wherein said coupling means (42, 43) are provided on said cover (5).

14. The module as claimed in claim 13, wherein said coupling means comprise complementary recesses and projecting bosses.

15. The module as claimed in claim 1, comprising, at the other end of said longitudinal body:
  another end cover coupled to the other end of said longitudinal body;
  another internal radial electrical connection plate comprising a plurality of electrical contact means suitable for being respectively in contact on the other end of said electric cells;
  another external radial electrical connection plate comprising a plurality of electrical contact means for external electrical links of this external plate;
  and another electrical connection means of said other internal and external electrical connection plates, axially traversing said other cover.

16. An assembly of at least two battery modules as claimed in claim 1,
  wherein two battery modules (1A and 1B) are placed longitudinally one next to the other and coupled laterally by means of said first and second complementary coupling means in a position such that their external radial electrical connection plates extend in one and the same radial plane, these external radial electrical connection plates being electrically connected by a metal link plate (46);
  and/or wherein two battery modules (1C, 1D) are aligned one above the other and coupled axially by means of said first and second complementary coupling means in a position such that their external radial electrical connection plates extend one facing the other, these external radial electrical connection plates being electrically connected by means of an elastic bar (48).

* * * * *